M. KONGSBAK.
BURNER FOR AUTOGENOUS WELDING AND CUTTING OF METAL.
APPLICATION FILED OCT. 29, 1913.
1,098,119.
Patented May 26, 1914.
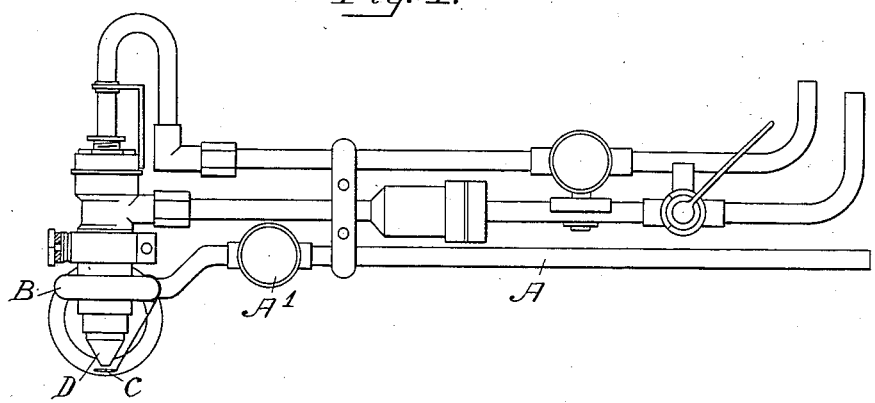
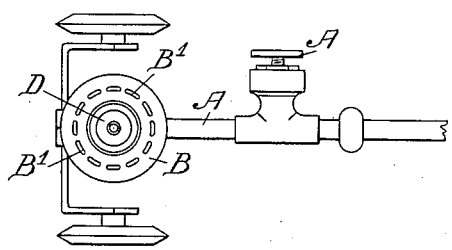

UNITED STATES PATENT OFFICE.

MARINUS KONGSBAK, OF LÜBECK, GERMANY.

BURNER FOR AUTOGENOUS WELDING AND CUTTING OF METAL.

1,098,119. Specification of Letters Patent. Patented May 26, 1914.

Application filed October 29, 1913. Serial No. 797,978.

*To all whom it may concern:*

Be it known that I, MARINUS KONGSBAK, subject of the German Emperor, residing at the free and Hanseatic town of Lübeck, Germany, have invented certain new and useful Improvements in Burners for Autogenous Welding and Cutting of Metal, of which the following is a specification, reference being had therein to the accompanying drawing.

At the present day welding and cutting of iron and steel plates, brackets and the like is almost exclusively effected by the autogenous method. However, it frequently happens, especially in shipbuilding, that the object to be welded or cut is located beneath the surface of the water.

The subject of the present invention is a method by means of which welding and cutting can be effected beneath the surface of water. The actual operative means are the same as those ordinarily employed for autogenous welding and cutting, for instance an oxygen and combustible gas burner, but the operation is rendered possible by a jet of compressed air projected from the nozzle of the burner alongside the operative flame. The air issuing at high pressure, corresponding to the pressure of the water, creates a water-free space, within which by an automatic igniter the operative flame can be kindled. The air preferably flows in an annular jet around and separated a sufficient distance from the flame, so that the latter is undisturbed by the jet of air and can freely impinge on the piece of work. The jet of air is projected parallel to the flame, impinges against the work and forms thereby an impenetrable mantle against the water.

On the accompanying drawing a known form of autogenous burner is shown fitted with an example of an arrangement for providing a jet of air, in which:—

Figure 1 is a side elevation, and Fig. 2 an inverted plan.

The air supply pipe A is fitted beneath the gas supply pipe of the welding and cutting apparatus and is provided with a valve $A^1$. The pipe A terminates in a ring B surrounding the nozzle of the burner, and this ring B is formed with apertures or slits $B^1$, Fig. 2. A platinum or other igniter C, for igniting the gas flame, can be attached to the ring B. Before the flame is ignited at the nozzle of the burner D by the igniter C, the valve $A^1$ is opened, whereby the air flows out of the apertures $B^1$ and surrounds the gas jet, so that the flame thereof can operate in the well known manner.

Having now particularly described and ascertained the nature of my said invention and in what manner the same is to be performed, I declare that what I claim is:—

1. A device for autogenous welding and cutting of metal beneath the surface of water comprising a compressed air supply pipe, a ring on the inner end of said supply pipe and provided with apertures on one face thereof, a fuel supply pipe, and a burner on the inner end of said fuel pipe extending through said ring as described.

2. In a device for the autogenous welding and cutting of metal beneath the surface of water, a compressed air supply pipe provided with a valve, a ring on the inner end of said supply pipe and provided with apertures in its under side, a fuel supply pipe, a burner on the inner end of said fuel pipe and means for igniting the fuel, as specified.

In testimony whereof I affix my signature in the presence of two witnesses.

MARINUS KONGSBAK.

Witnesses:
 WILHELM GRAEFE,
 JOHN WULF.